UNITED STATES PATENT OFFICE.

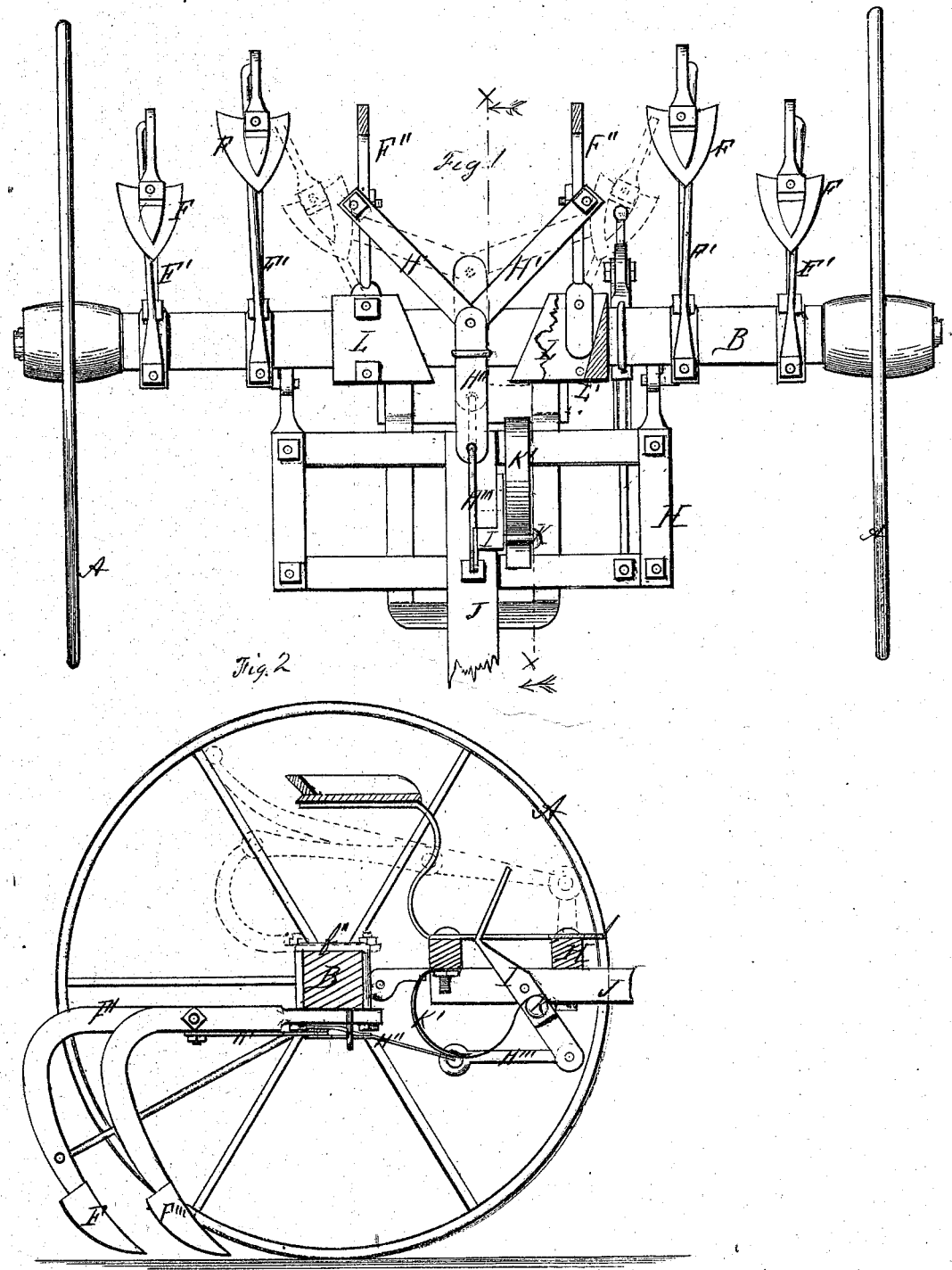

HORACE CARR, OF WOOSTER, OHIO.

IMPROVEMENT IN CULTIVATORS.

Specification forming part of Letters Patent No. 100,500, dated March 8, 1870.

*To all whom it may concern:*

Be it known that I, HORACE CARR, of Wooster, in the county of Wayne and State of Ohio, have invented certain new and useful Improvements in Cultivators; and I do hereby declare the following to be a full, clear, and exact description thereof, reference being had to the accompanying drawings, forming part of this specification, in which—

Figure 1 is a plan view of the under side of cultivator; Fig. 2, section on line $x$ $x$, Fig. 1.

This invention relates to a wheel-cultivator, and, as shown in the drawings, the shovel-beams are attached to a square axle, to which, in front, is hinged a small frame, supporting a driver's seat and the forward end of a lever for raising the shovels from the ground, making the cultivator, which may be chiefly considered the subject of my improvements, similar in general construction to that shown in the application of D. F. Carr, patent granted June 8, 1869.

Fig. 1 shows a cultivator with six beams and shovels. Their relative distance apart is the same as in D. F. Carr's, with the middle beam removed. The beams marked F' F' F' F' are rigidly secured to the axle B. Those marked F'' are arranged adjustably on perpendicular axes, which axes may be the rear ends of the loops $f'''$, that hold the two middle beams F''' to the axle B, as clearly shown in Fig. 2; or, in lie of said loops, pins or pivots inserted in or attached to the axle may be employed.

H' are toggle-arms connecting the beams F''. At the juncture of said toggle-arms a link, H'', is attached, on the end of which the toggle-arms work.

H''' is also a link, connecting with the forward end of the link H''.

I is an arm or lever pivoted to the tongue J, and passing through a slot above the frame H, where it is formed into a foot-piece or handle, J'. The lower end of this lever connects with the link H'''.

K is a pin or projection on the side of the lever I.

K' is a spring attached to the frame H and pressing on the projection K.

L are boxes or hollow clips placed on the axle B, over the ends of the two middle loops, the nuts which hold the latter being placed on the loops outside the boxes or clips L. These clips cover the forward ends of the beams F''', and should have one side of their interior beveled, as shown at L', Fig. 1, to keep the middle beams from being drawn too near each other. Pins inserted in the axle will answer the same purpose. The clips L aid in supporting the ends of the adjustable beam.

The purpose of the improvements described is to better adapt the cultivator to the cultivating of cotton or other bushy vegetation growing in rows. Each side of a row is cultivated by a middle and two adjoining outer shovels. If the middle beams were rigidly attached to the axle, like the others, the bushes, varying in size, would sometimes be torn by or form obstacles to the implement. My invention, however, obviates such difficulty by allowing the middle beams, which are nearest the bushes or rows, to be swung around outside them, while at the same time their shovels are still kept near enough to cultivate the soil underneath. The beams are swung around by the pressure of the driver's foot against the lever I. The force of the spring K' returns them to their first position, when the lever is released.

A reference to the dotted lines in Fig. 1 will explain the operation.

The connection between the toggles H' and lever I is made in two links or articulated parts, to allow the axle to be turned freely.

What I claim as my invention, and desire to secure by Letters Patent, is—

1. The combination, in a wheel-cultivator, of the shovel-beams F'' F''', arranged to work on perpendicular axes, toggles H' H', lever I, and connecting link or links H'' H''', when so arranged that the said beams may be turned simultaneously in contrary directions without raising the shovels from the ground, substantially as specified.

2. Connecting the shovel-beams F'' F''', oscillating on perpendicular axes or pivots, by toggles H' H', so as to give said beams simultaneous movement in contrary directions without raising the attached shovels from the ground.

3. The combination, in a wheel-cultivator, of a turning-axle, B, rigid shovel-beams F', movable shovel-beams F''', arranged to turn simultaneously on vertical axes in contrary directions, frame H, and lever M, substantially as and for the purpose set forth.

4. The hollow clips L, or their equivalents, in combination with the loops $f''$ and movable beams F'', as and for the purpose set forth.

5. The employment of the loops $f''$ as pivots for the beams F'', in the manner set forth.

6. The spring K', in combination with the lever I and beams F'', as and for the purpose set forth.

HORACE CARR.

Attest:
DAVID ROBISON, Jr.,
JAMES C. JACOBS.